United States Patent [19]

Spencer

[11] Patent Number: 5,186,522
[45] Date of Patent: Feb. 16, 1993

[54] AIR DRYER PURGE LINE
[75] Inventor: Joseph C. Spencer, Kansas City, Mo.
[73] Assignee: Midland Brake, Inc., Kansas City, Mo.
[21] Appl. No.: 764,913
[22] Filed: Sep. 24, 1991
[51] Int. Cl.$^5$ .............................................. B60T 17/00
[52] U.S. Cl. ........................................ 303/1; 55/218; 55/316; 60/307
[58] Field of Search ...................... 303/1; 55/218, 316, 55/163; 60/1 R; 123/307, 289

[56] References Cited
U.S. PATENT DOCUMENTS

| 3,943,711 | 3/1976 | Nagumo et al. | 60/307 X |
| 4,096,692 | 6/1978 | Nakamura et al. | 60/307 |
| 4,999,035 | 3/1991 | Warndorf | 55/316 X |
| 5,066,317 | 11/1991 | Gross et al. | 55/316 X |

Primary Examiner—Robert J. Oberleitner
Assistant Examiner—Lee W. Young
Attorney, Agent, or Firm—Leydig, Voit & Mayer, Ltd.

[57] ABSTRACT

A governor-controlled pneumatic braking system for use with vehicles equipped with an internal combustion engine having a unit associated therewith for discharging engine exhaust gases. The system includes an air dryer to effect removal of moisture and contaminants from the compressed air. The air dryer is provided with a unit for reversely flowing purge air therethrough when the compressor is not operating in the loading or compressing cycle. A conduit are provided for subjecting the purge air exhausting from the dryer to high temperatures so as to cause vaporization of moisture and combustion of combustible contaminants thereby preventing their discharge into the environment.

2 Claims, 2 Drawing Sheets

AIR DRYER PURGE LINE

This invention relates to improvements in pneumatic braking systems.

BACKGROUND OF THE INVENTION

As is well known, heavy duty road vehicles, such as trailer tractors, employ compressed air brake systems. Such pneumatic or air braking systems generally involve an air compressor operable in normal or unloading modes, a governor for controlling the operating cycle of the air compressor, an air dryer and a reservoir for holding pressurized air for delivery to the vehicle brakes. Air for the pneumatic brake system is supplied from the air intake manifold of the vehicle engine. The vehicle may or may not be equipped with a turbocharged or supercharged internal combustion engine from which engine exhaust gases at high temperatures are discharged through an exhaust stack.

When the pressure in the air reservoir falls below a predetermined minimum pressure, say about 100 psig, the compressor governor then causes the air compressor to operate in a normal or loading mode to compress air. The compressed air from the air compressor during its normal or compressing cycle is passed through an air dryer to remove moisture and contaminants and then into the air brake reservoir or reservoirs. The air dryer contains a filter/desiccant for removing contaminants and moisture from the air introduced therein. When the desired pressure, say about 120 psig, is attained in the pressurized air reservoir, the compressor governor functions to cause the air compressor to unload (unloading mode). When the compressor operates in the unloading mode the intake air from the vehicle engine manifold passes through the compressor, but is not compressed therein.

During the unloading stage of the compressor air flows reversely through the dryer for purging the filter/desiccant in the dryer of contaminants and moisture accumulated therein. Such reverse flow and purging may continue until the governor device restores the compressor to its cut-in or compressing mode. The purge air discharges from the dryer to the atmosphere periodically with force carrying with it the contaminants and moisture which have accumulated in the dryer. While discharge of moisture to the atmosphere is not particularly harmful, discharge of other contaminants such as oil droplets and oil-coke particles creates environmental pollution problems by being deposited on the ground or on roads. These contaminants being toxic and flowable in nature present safety hazards also. Because of the high lubrication requirements in air compressors, contamination of the compressed air with lubricating oil and oil-coke contaminants is significant.

OBJECTS OF THE INVENTION

It is therefore a general object of this invention to provide improvements in pneumatic braking systems.

It is another object of this invention to provide improvements in a pneumatic braking system which are environmentally advantageous.

It is still another object of this invention to provide means in a pneumatic braking system for reducing atmospheric pollution.

It is a further object of this invention to provide means in a pneumatic braking system for reducing pollution of the atmosphere by toxic flowable materials.

It is another object of this invention to eliminate safety hazards in the operation of a pneumatic braking system.

These and other objects will be apparent as the detailed description proceeds.

SUMMARY OF THE INVENTION

In one preferred and important application, the invention relates to a governor-controlled pneumatic braking system for use with vehicles equipped with an internal combustion engine having means associated therewith for discharging engine exhaust gases. The engine supplies air to the braking system from the engine manifold. The system includes an air dryer intermediate said compressor and an air brake reservoir to effect removal of moisture and contaminants from the compressed air. The air dryer is provided with means for reversely flowing purge air therethrough when the compressor is not operating in the loading or compressing cycle. The purge air removes contaminants and moisture from the dryer and is discharged therefrom through a purge valve. Means are provided for subjecting the purge air exhausting from the dryer to high temperatures so as to cause vaporization of moisture and combustion of combustible contaminants thereby preventing their discharge into the environment.

DESCRIPTION OF PREFERRED EMBODIMENTS OF THE INVENTION

Figure 1:
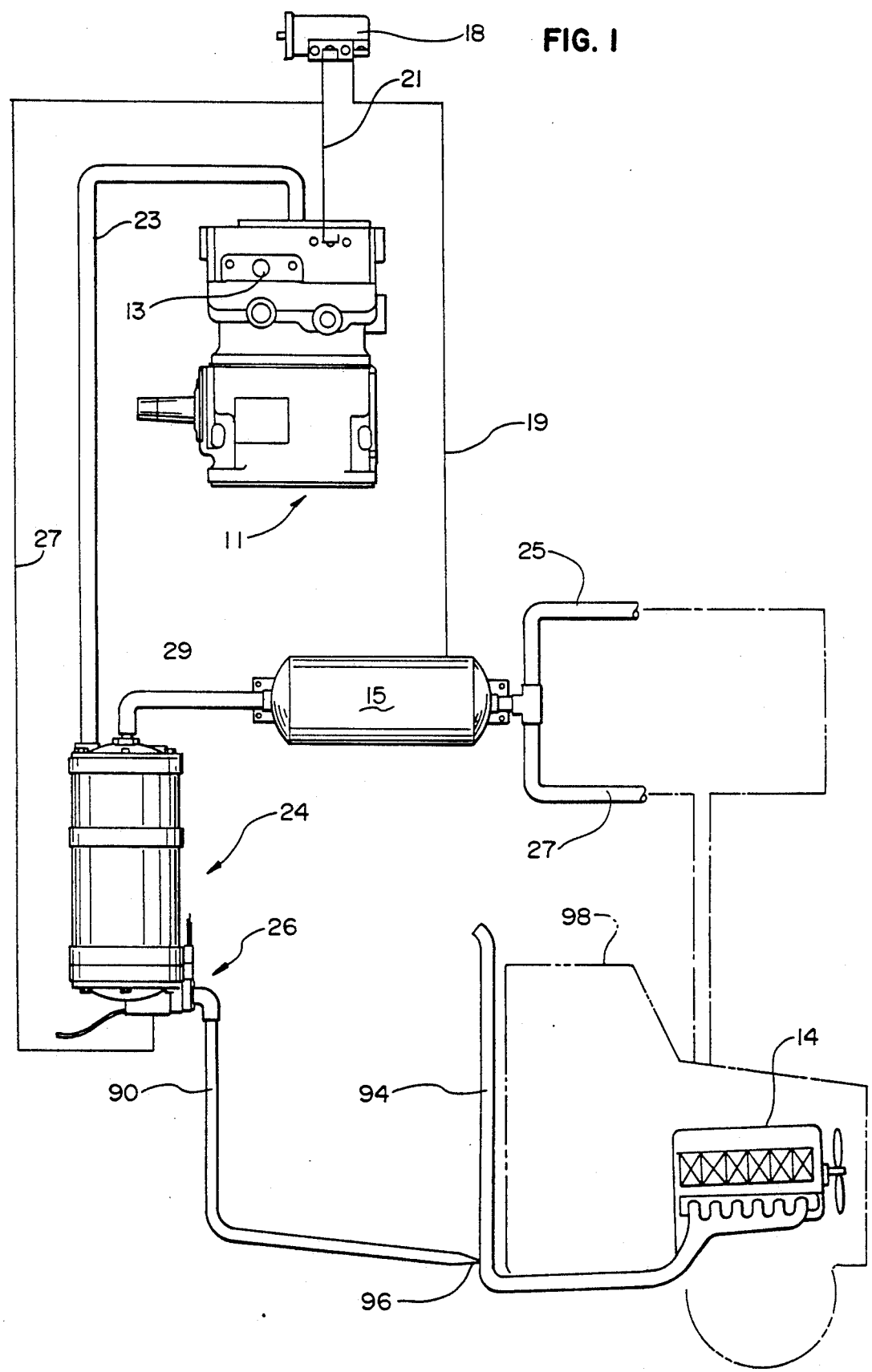
FIG. 1 relates to a preferred embodiment of the invention and illustrates schematically the arrangement and operation of a governor-controlled air compressor, air dryer and a pressurized air reservoir as in a typical compressed air brake system for vehicles and having associated therewith means for reducing environmental pollution.

Referring to FIG. 1 of the drawings, an air compressor 11 of known type is adapted to receive through port 13 air from an internal combustion engine 14. The size and capacity of the air compressor 11 will depend upon the operational demands imposed thereon. The air compressor, as is usual, operates in both a loading (compressing) and an unloading (non-compressing) mode. When the air pressure in reservoir 15 falls below a predetermined minimum, say 100 psig, the compressor governor 18 causes the air compressor to compress air, i.e. operate in the loading cycle or mode. Signal line 19 provides communication between the air reservoir 15 and governor 18 and is continuously charged with air which is at the same pressure as the air in reservoir 15. By virtue of this communication the compressor governor 18 causes the compressor 11 to operate in either the loading or unloading mode depending upon the air pressure in the reservoir 15.

The compressor governor 18 is of conventional design and may be preset to respond to certain operating premises of the brake system with which it is associated. Air line 21 connects the governor 18 with the compressor 11 whereby, depending on the pressure in the system, the compressor is caused to operate in either the loading (normal) mode or the unloading mode. Operation of an air compressor by a governor is well known and widely practiced in the pneumatic braking art, for example. For a more detailed description as to the operation of an air compressor as controlled by a governor in an air braking system, see, for example, U.S. Pat. No. 4,710,108, the disclosure of which is incorporated herein.

In a typical conventional air braking system compressed air from compressor 11 passes through air line 23 to air dryer 24, which removes water and other contaminants, such as oil, therefrom. The dried or purified compressed air from air dryer 24 is then passed via line 29 to the air reservoir 15 so as to maintain the desired air pressure therein for delivery to the air brakes of a vehicle through lines 25 and 27. When the air pressure within the reservoir 15 reaches the required minimum pressure, the compressor governor causes the air compressor to switch to the unloading cycle. During the unloading cycle purge air reversely flows within the air dryer to remove water and contaminants therefrom and is removed through purge valve 26. Pneumatic pressure transmitted through line 27 controls the operation of purge valve 26.

Purge air carrying contaminants and moisture which have accumulated in the dryer flows out of purge valve 26 through purge air line 90 into the exhaust stack 94 of an internal combustion engine 14 for a truck tractor 98. Line 90 is provided with a restricted neck or Venturi portion 96 of reduced diameter near its juncture with the exhaust stack so as to create a Venturi flow effect. This Venturi flow effect creates a vacuum which pulls the purge air through line 90 into the engine exhaust stack and assures that water in the purge air does not remain in line 90 and possibly freeze therein at low ambient temperatures. Preferably, purge line 90 joins the engine exhaust stack 94 adjacent the lower end of the stack near the exhaust manifold of the internal combustion engine 14. The engine exhaust gas enters the exhaust stack 94 at high temperatures on the order of 1500°-2000° F. or more. Thus, the moisture and oil and other combustible contaminants in the purge air when introduced into the hot exhaust gases within engine exhaust stack 94 are burned and not discharged into the atmosphere.

Figure 2:
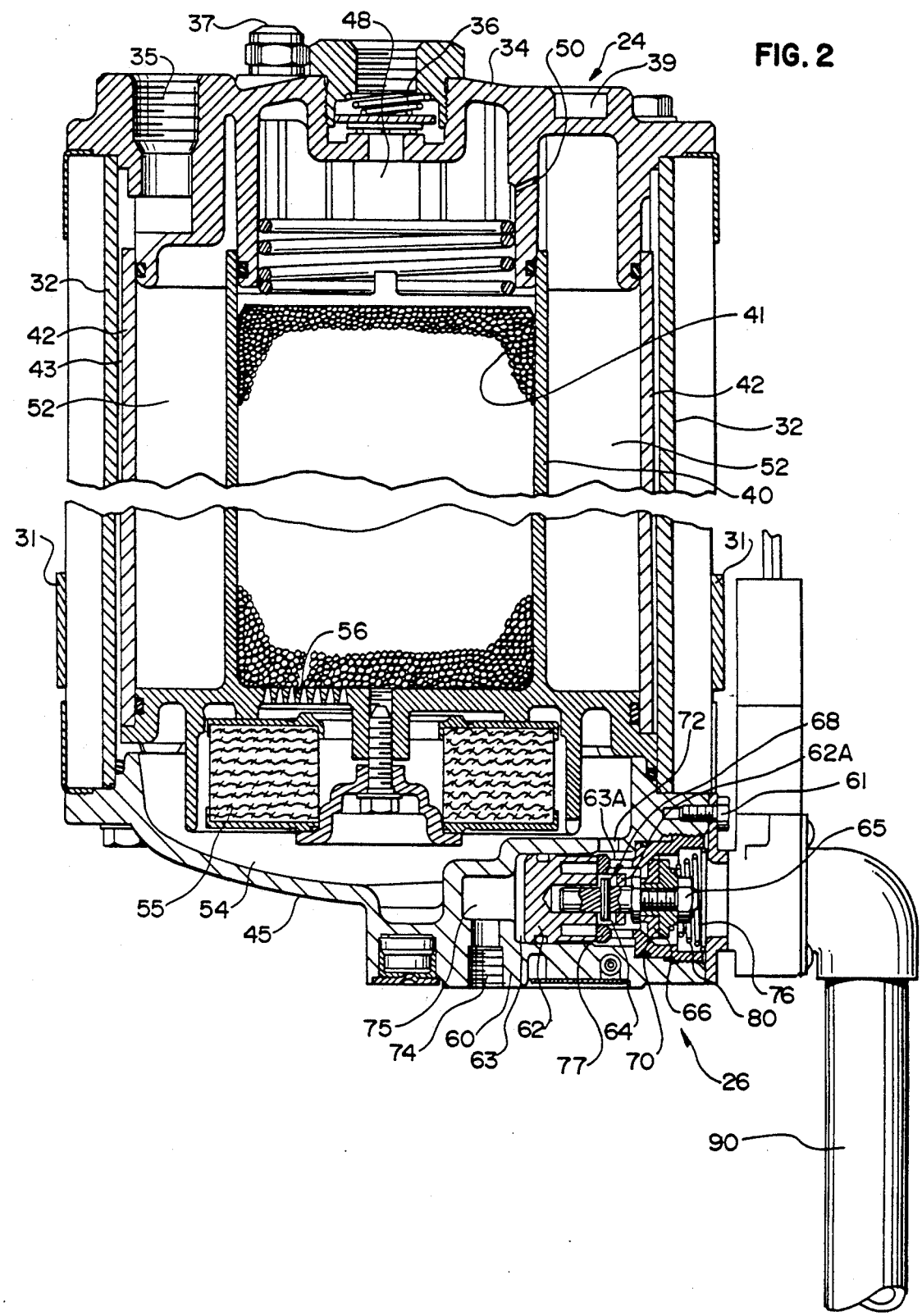
FIG. 2 is a view in cross-section of an air dryer having means connected thereto to prevent contaminants in the purge air from being discharged to the atmosphere.

FIG. 2 shows an air dryer 24 of conventional design having associated therewith means for reducing environmental pollution in accordance with this invention. The air dryer described with reference to FIG. 2 is a typical air dryer equipped with a particularly preferred purge valve of the type disclosed in U.S. patent application Ser. No. 451,222, the disclosure of which is incorporated herein. This purge valve permits exhausting of purge air from the dryer only when the pressure of the purge air exceeds the pressurized intake air from a supercharged source. However, it is to be understood that the present invention is applicable to air dryers in general having any type of purge valve through which purge air is exhausted from the dryer and is not limited to dryers having purge valves controlled by the pressure of the intake air from the vehicle engine.

Thus, referring to FIG. 2, the numeral 24 generally designates an air dryer of conventional design which is usually cylindrical in shape and which can be mounted in the braking system either horizontally or vertically by means of adjustable mounting brackets 31. As is typical, the air dryer 24 has an outer housing 32 formed of a lightweight metal such as aluminum. Top closure cover 34 is provided with air intake port 35 through which compressed air from the air compressor 11 is received via air delivery line 23 as shown in FIG. 1.

Top closure 34 is also provided with a one-way check valve 36 through which pressurized dry air leaves the dryer and passes through air line 29 to the air reservoir 15, also shown in FIG. 1. Preferably, a pressure relief valve 37 is provided in the top cover of the air dryer which may also include, if desired, an additional port 39 whereby additional purge air can be introduced into the air dryer if necessary or desired.

Centrally located within the dryer is a generally cylindrical elongated drying chamber 40 which is packed with a desiccant material 41 such as sodium aluminosilicate (molecular sieve) and the like. A convex bottom 45 seals the air dryer. Purge valve 26 is located in the bottom portion of the dryer.

An air plenum chamber 48 is located above the drying chamber 40 and a relatively narrow, say 0.060 inch diameter, inclined passageway 50 provides communication between the plenum 48 and an elongated annular purge air chamber 52.

Closely spaced from the outer housing 32 is an inner shell 42 to provide air passageway 43 through which flows air from compressor 11 during the normal or compressing mode of the compressor. The compressed gas is cooled during flow through the elongated air passageway 43 by virtue of extended surface contact with the walls defining the passageway.

Compressed air from the compressor enters port 35 and flows downwardly through air passageway 43. Air passage 43 is a narrow elongated passage and provides a large gas contact area to effect cooling of the compressed gas. The compressed air flowing downwardly through passageway 43 enters sump 54 and then flows upwardly through a filter element 55 which can, for example, be a pleated polyester filter. The compressed air then passes upwardly through openings 56 and upwardly through the desiccant chamber 40 wherein moisture is removed therefrom. A portion of the compressed air flows through the inclined passageway 50 and enters air purge chamber 52. The greater portion of the compressed air flows through one-way check valve 36 and through line 29 to air reservoir 15 during the loading cycle of the compressor. The check valve 36 is closed during the purge cycle of the compressor and retains the pressurized air in air reservoir 15.

When the air pressure in the air reservoir is at a satisfactory pressure, say 120 psig, the governor 18 signals the compressor to unload via line 21 and at the same time signals the purge valve to open via line 27. The pressure from line 27 enters port 74 and moves piston 63 to the right (as shown in FIG. 2). This allows the internal pressure in the sump 54 to open valve element 66 to suddenly exhaust the plenum volume 48, the desiccant volume 41, the filter volume 55 and the sump volume 54. The air in the purge volume 52 being restricted by small passage 50, expands and migrates reversely through the desiccant 41 and filter 55 removing moisture and contaminants and escapes through valve element 66. Spring 80 is designed so that at a given pressure, say 25 psig, it forces valve element 66 to seal at its seat 70, thus maintaining a pressure of 25 psi within the dryer. It is to be appreciated that the present invention is advantageous in connection with air dryers in general whether or not the air dryer is provided with pressure retention means as described above.

The purge air exhausting from purge valve 26 passes through purge air line 90 into engine exhaust stack 94 wherein combustion and vaporization of purge air contaminants takes place.

The present invention is environmentally advantageous from both aesthetic and safety standpoints. The invention prevents the deposition of unsightly oil deposits on roads which are toxic in nature. Also, the present invention has additional safety advantages by preventing the purge air exhausting from the dryer which is under pressure from striking one who may be near the exhaust purge valve when the air dryer purges.

Those modifications and equivalents which fall within the spirit of the invention are to be considered a part thereof.

What is claimed is:

1. In a pneumatic braking system for vehicles equipped with an internal combustion engine having engine exhaust gas discharge means and an air dryer vessel intermediate an air compressor and an air reservoir, said air dryer vessel having a purge air outlet and means for reversely flowing purge air therethrough when the air compressor is switched to the unloading cycle, the improvement which consists in effecting combustion and vaporization of contaminants present in the purge air from the said air dryer vessel by introducing the purge air into the hot exhaust gases from said engine via a conduit providing communication between said purge air outlet of said air dryer vessel and the engine exhaust gas discharge means.

2. A pneumatic braking system in accordance with claim 1 wherein said conduit is configured so as to effect a venturi flow effect therein.

* * * * *